No. 874,741.
PATENTED DEC. 24, 1907.
C. R. DAVIS.
CORN PLANTER.
APPLICATION FILED SEPT. 24, 1906.
2 SHEETS—SHEET 1.
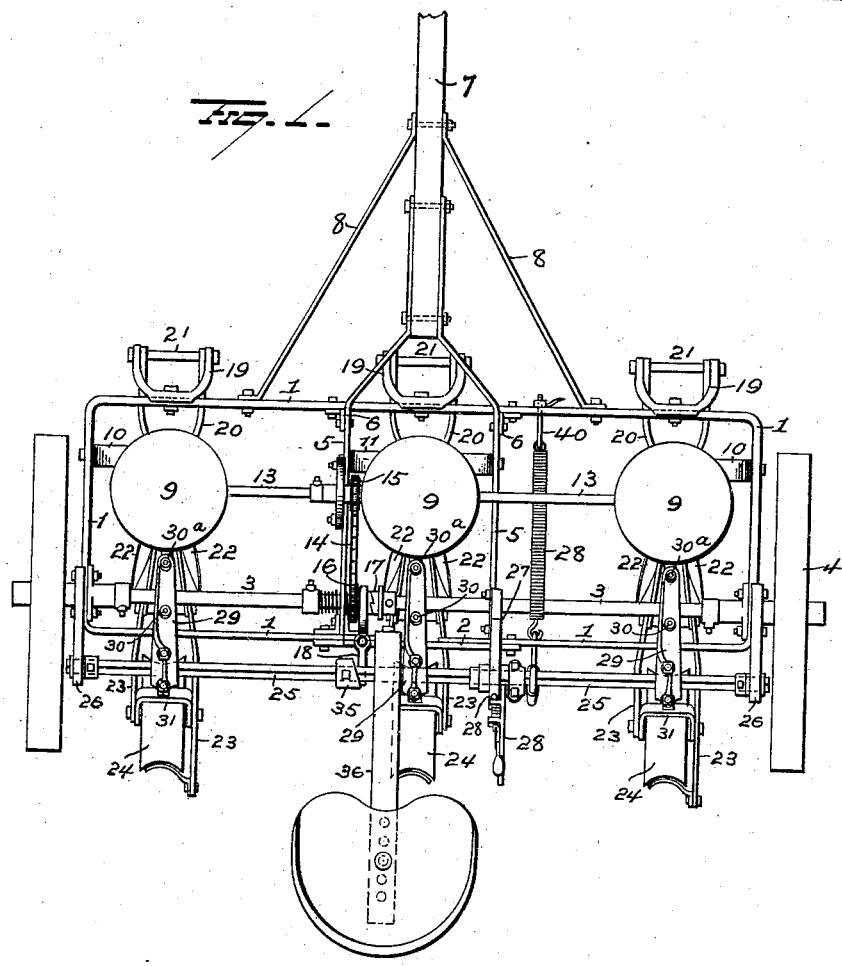
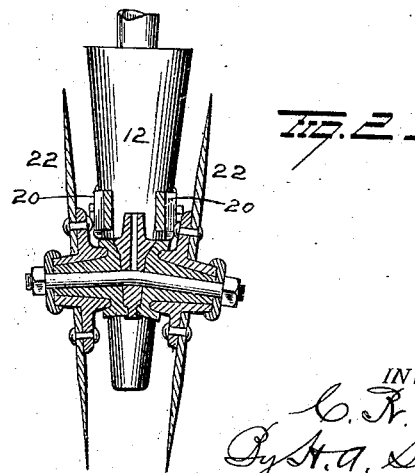
WITNESSES
INVENTOR
C. R. Davis
By H. A. Seymour
Attorney

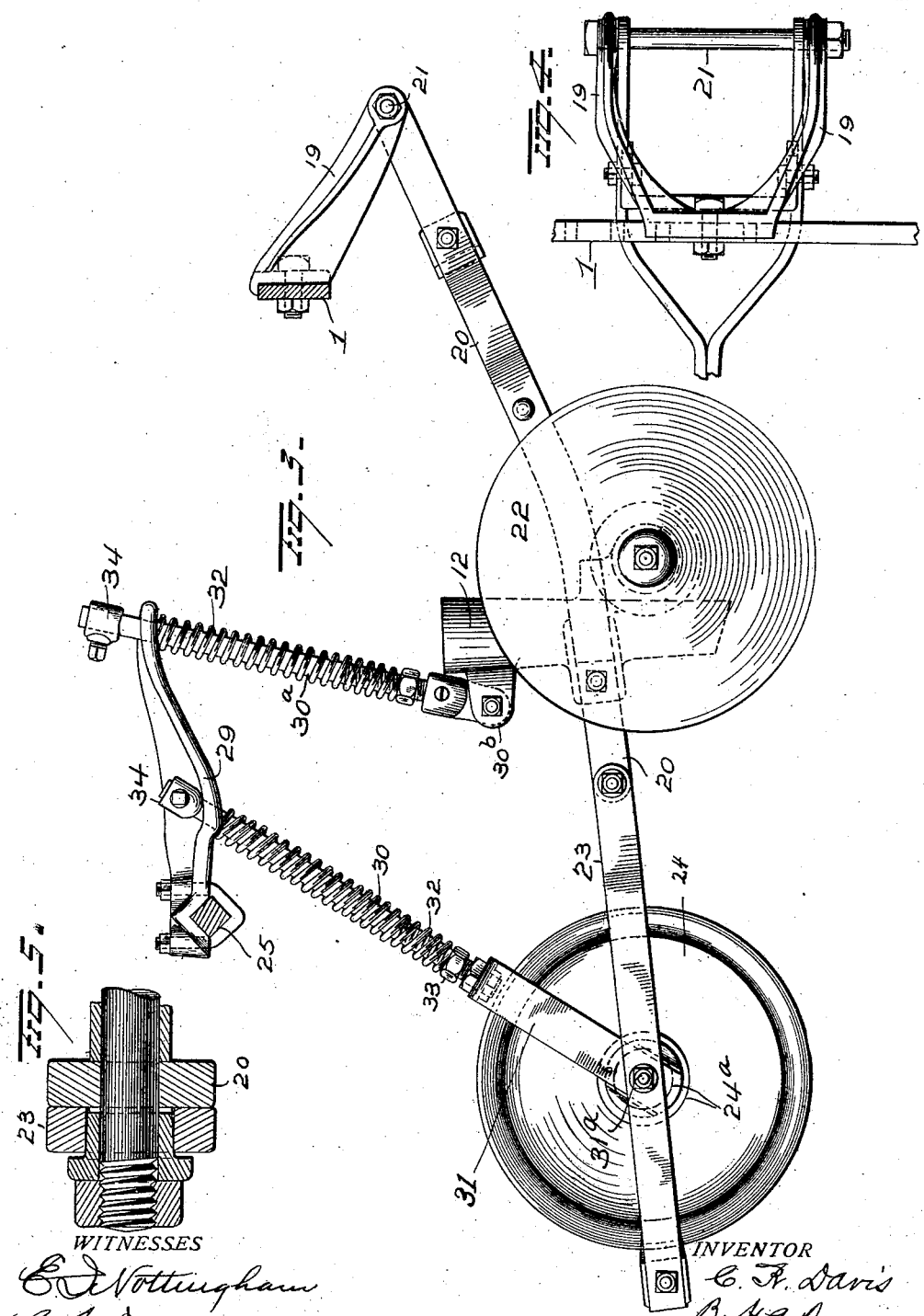

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

CORN-PLANTER.

No. 874,741.  Specification of Letters Patent.  Patented Dec. 24, 1907.

Application filed September 24, 1906. Serial No. 335,997.

*To all whom it may concern:*

Be it known that I, CALVIN R. DAVIS, a resident of South Bend, in the county of St. Joseph and State of Indiana, have invented certain new and useful Improvements in Corn-Planters; and I do hereby declare the following to be a full, clear, and exact description of the invention, such as will enable others skilled in the art to which it appertains to make and use the same.

My invention relates to improvements in corn planters, the object of the invention being to provide an improved planter arranged to plant three rows simultaneously and has reference more particularly to a planter which opens the seed receiving furrows by means of obliquely arranged disks attached to the drag bars in advance of the seed spouts with covering wheels following the disks.

A further object is to provide improved means for depressing and lifting the drag bars, their disks and covering wheels and provide compression springs for holding the disks and covering wheels in yielding contact with the ground and provide an adjusting nut for each spring to regulate the tension thereof, said springs allowing the disks to rise and fall as the machine travels over uneven ground and for that reason enable the seed to be planted at a more uniform depth.

A further object is to provide a planter constructed of as few parts as possible and at the same time so that it shall be strong and durable, simple in operation and of light draft.

With these and other objects in view, the invention consists in certain novel features of construction and combinations and arrangements of parts as will be more fully hereinafter described and pointed out in the claims.

In the accompanying drawings Figure 1 is a plan view illustrating my improvements. Fig. 2 is a view in section through the disks. Fig. 3 is an enlarged view of one planter unit, and Figs. 4 and 5 are views of details of construction.

1 represents the main frame of the planter comprising a single bar bent into rectangular form and the ends connected at the rear of the machine by bars 2 as shown. This frame is provided with bearings supported on axle 3 and the latter mounted on wheels 4, one of which latter is loose on the axle and the other secured thereto, for rotating the same as the machine moves over the ground.

Pole irons 5 extend across the frame 1, are bolted to brackets 6 on the front and rear cross bars thereof and converging at their forward ends, are bolted to the tongue 7. Brace bars 8 are also secured to the front bar of the frame 1 and to the tongue 7.

9 represents three seed receptacles, the two outside ones being supported on bracket arms 10 secured to the side bars of frame 1 and the central seed receptacle is supported on a bracket or yoke 11 secured to pole irons 5. The seed droppers of feeding mechanisms for the receptacles discharge into boots 12, and are all operated by a single shaft 13 driven by axle 3, the latter being connected therewith by a sprocket chain 14, passing over sprocket wheels 15 and 16 on shaft 13 and axle 3 respectively, and a clutch 17 connects sprocket wheel 16 with axle 3. A pivoted lever 18 is operated when the planting mechanisms are elevated, to move the clutch 17 and stop the feed, as will more fully hereinafter appear.

Drag bar hangers 19 are secured to the front bar of frame 1, and this bar of the frame is made with a series of bolt openings for the outside hangers to permit the planting mechanisms to be moved inward or outward from the center to vary the width of the rows planted. Drag bars 20 are pivotally secured to the hangers 19 by bolts 21 and are securely bolted near their rear ends to the boots 12. In advance of the boots, conical bearings are provided for disks 22 disposed at an angle to open a furrow for the seed. Covering wheel drag bars 23 are pivotally connected at their front ends to the rear ends of drag bars 20 and are of forked formation with covering wheels 24 mounted therein on tubular spindles 24$^a$.

25 represents a horizontal square shaft supported at the ends in rearwardly extending arms or brackets 26 on frame 1 and at its center by a bearing on the toothed sector 27 also secured to the frame. An operating lever 28 is secured on this shaft 25 and carries a spring detent 28 to lock in the sector 27 and hold the shaft against turning.

Crank arms 29 are adjustably secured on shaft 25 and have openings between their ends to receive rods 30 secured to forked brackets 31 straddling follower wheels 24 and said brackets are secured to drag bars 23 by bolts 31ª extending through tubular spindles 24ª. Coiled springs 32 are located on rods 30 below arms 29 and adjusting nuts 33 are located on the rods 30 to adjust the tension of the springs and set screw collars 34 are secured on rods 30 above arms 29.

Spring rods 30ª similar to the spring rods 30 above described are connected at their lower ends to brackets 30ᵇ on boots 12, and at their upper ends said rods 30ª project through openings in the ends of arms 29. Springs 32 are located on the rods 30ª below the arms and collars 34 are secured to said rods above the arms 29 the same as the above described spring rods.

When the shaft 25 is turned by the lifting lever in one direction, the rods 30 and 30ª and all the planting mechanisms will be elevated from the ground and when the shaft 25 is turned in the opposite direction, the planting mechanisms will be lowered and by forcing the shaft further in this direction the springs 32 will be compressed to exert a greater downward spring pressure on the planting mechanisms.

A cone collar 35 is secured on shaft 25 adjacent to lever 18, so that when shaft 25 is turned to elevate the lifting mechanism, clutch 17 will be thrown to stop the feeding mechanisms, and when the planting mechanisms are again lowered, the clutch will be thrown to start the feeding mechanisms.

An upwardly and rearwardly projecting spring seat bar 36 is secured to the rear bar of frame 1 and is made with a series of openings to receive, in any of them, the bolt securing seat 37 thereto, and permit the seat to be moved forward or rearward on the bar to better adjust the weight of the driver to the machine.

By adjusting the drag bar hangers 19 on frame 1 and the arms 29 on shaft 25 the outer mechanisms can be moved toward or away from the central mechanism to decrease or increase the distance between the rows.

A lifting spring 28ª is connected at its rear end to a depending arm 29ª on shaft 25 and at its front end to the front bar of frame 1 by a tension bolt 40, and the tension of this spring assists the operator in moving the lever to elevate the planting mechanisms and counterbalances the weight thereof.

It will be seen that the covering wheels 24 can rise and fall independent of its disks and vice versa and all of the planting mechanisms may accommodate themselves to the contour of the ground without regard to the others.

A great many slight changes might be made in the general form and arrangement of the parts described without departing from my invention and hence I would have it understood that I do not restrict myself to the precise details set forth but consider myself at liberty to make such slight changes and alterations as fairly fall within the spirit and scope of my invention.

Having fully described my invention what I claim as new and desire to secure by Letters-Patent, is:—

1. In a planter, the combination with a frame, of a series of rearwardly projecting drag bars secured to the frame, furrow opening disks secured to the drag bars, follower wheels, drag bars for the follower wheels pivotally secured to the rear ends of the first mentioned drag bars, a shaft, a lever to move the same, arms on the shaft, yokes on the follower wheel drag bars, rods on said yokes and on the first mentioned drag bars projecting through holes in the arms, springs on the rods below the arms, means for adjusting the tension of said springs, collars on the rods above the arms, and a counterbalance spring tending to turn the shaft to lift the drag bars and parts connected therewith.

2. In a planter, the combination with a frame, of a drag bar secured thereto, furrow opening disks secured to the drag bar, a follower wheel drag bar pivotally secured to the rear end of the first-mentioned drag bar, a follower wheel connected with its drag bar, a fork straddling the follower wheel and secured to its drag bar, a rod secured to said fork, a shaft, a crank arm thereon having an opening to receive the rod, a coiled spring on the rod, an adjusting nut on the rod at the lower end of the spring to adjust the tension of the latter, a collar secured on the rod above the arm, and a lever to turn the shaft to raise and lower the drag bars and vary the spring pressure thereon.

3. In a corn planter, the combination with a frame, a series of hangers at the front thereof, drag bars pivotally secured to the hangers and extending rearward below the frame, and furrow opening disks secured to the drag bars, of follower wheel drag bars pivotally secured to the rear ends of the first-mentioned drag bars, follower wheels connected with the last mentioned drag bars, forks secured to the last-mentioned drag bars and straddling the follower wheels, upwardly projecting spring rods on the forks, a shaft, crank arms thereon connected with the spring rods, a depending crank arm on the shaft, a lifting spring connecting the depending crank arm with the front of the planter frame, a lever to turn the shaft, a toothed sector on the frame, and a spring pressed detent to engage the sector and lock the lever.

In testimony whereof, I have signed this specification in the presence of two subscribing witnesses.

CALVIN R. DAVIS.

Witnesses:
J. C. SCHULTZER,
P. A. HUNZINGER.